(No Model.) 7 Sheets—Sheet 1.

J. MERRITT & W. E. SPENCER.
PHOTOGRAPHIC CAMERA.

No. 426,296. Patented Apr. 22, 1890.

(No Model.) 7 Sheets—Sheet 2.

J. MERRITT & W. E. SPENCER.
PHOTOGRAPHIC CAMERA.

No. 426,296. Patented Apr. 22, 1890.

(No Model.) 7 Sheets—Sheet 3.

J. MERRITT & W. E. SPENCER.
PHOTOGRAPHIC CAMERA.

No. 426,296. Patented Apr. 22, 1890.

Witnesses
Chas. J. Williamson
Henry C. Hazard

Inventors
Jno. Merritt & Wm. E. Spencer, by
Crindle & Russell, their Attys (No Model.) 7 Sheets—Sheet 4.

J. MERRITT & W. E. SPENCER.
PHOTOGRAPHIC CAMERA.

No. 426,296. Patented Apr. 22, 1890.

Witnesses
Chas. J. Williamson
Henry C. Hazard

Inventors
Jno. Merritt and Wm. E. Spencer, by
Brindle and Russell, their Attys (No Model.) 7 Sheets—Sheet 5.

J. MERRITT & W. E. SPENCER.
PHOTOGRAPHIC CAMERA.

No. 426,296. Patented Apr. 22, 1890.

Fig. 5.

Witnesses
Chas. J. Williamson
Henry C. Hazard

Inventors
Jno. Merritt and W. E. Spencer, by
Arindle and Russell, their Attys.

THE NORRIS PETERS CO., PHOTO-LITHO., WASHINGTON, D. C.

(No Model.) 7 Sheets—Sheet 6.

J. MERRITT & W. E. SPENCER.
PHOTOGRAPHIC CAMERA.

No. 426,296. Patented Apr. 22, 1890.

Witnesses
Chas. J. Williamson
Henry C. Hazard

Inventors
Jas. Merritt and W. E. Spencer, by
Arundel & Russell, their Attys

(No Model.) 7 Sheets—Sheet 7.

J. MERRITT & W. E. SPENCER.
PHOTOGRAPHIC CAMERA.

No. 426,296. Patented Apr. 22, 1890.

Witnesses
Chas. F. Williamson
Henry C. Hazard

Inventors
Jno. Merritt and Wm. E. Spencer by
Prindle and Russell their Attys

UNITED STATES PATENT OFFICE.

JOHN MERRITT AND WILLIAM E. SPENCER, OF BROOKLYN, NEW YORK.

PHOTOGRAPHIC CAMERA.

SPECIFICATION forming part of Letters Patent No. 426,296, dated April 22, 1890.

Application filed March 9, 1889. Serial No. 302,597. (No model.)

*To all whom it may concern:*

Be it known that we, JOHN MERRITT and WILLIAM E. SPENCER, of Brooklyn, in the county of Kings, and in the State of New York, have invented certain new and useful Improvements in Photographic Cameras; and we do hereby declare that the following is a full, clear, and exact description thereof, reference being had to the accompanying drawings, in which—

Fig. 9 is a like view of the lever for operating the carrier-block and releasing the shutter-trigger.

The object of our invention is to expedite and facilitate the work of a photographer, more especially out-of-door work, where time is important; and to this end our invention consists, principally, in a camera in which a series of prepared plates by mechanical means may be successively moved from a storage-compartment into an exposing-compartment, and then automatically ejected therefrom into a second storage-compartment within the camera-casing, substantially as and for the purpose hereinafter specified.

It consists, further, in a camera which is provided with a compartment for the storage of prepared plates, a compartment for the exposure of prepared plates arranged above the prepared-plate storage-compartment, and a compartment for the storage of exposed plates, in combination with mechanism to automatically feed a plate into position to be elevated into the exposure-compartment and mechanism whereby it may be elevated thereto and automatically transferred thence into the last-named compartment, substantially as and for the purpose shown.

It consists, further, in a camera which is provided with a compartment for the storage of prepared plates, a compartment for the exposure of prepared plates, arranged above said prepared-plate storage-compartment, and a compartment for the storage of plates which have been exposed, in combination with mechanism whereby a plate may be elevated to said exposure-compartment and mechanism for automatically ejecting it from said exposure-compartment into said last-named storage-compartment, substantially as and for the purpose hereinafter shown and described.

It consists, further, in a camera which is provided with a compartment for the storage of prepared plates, a compartment for the exposure of prepared plates, and a compartment for the storage of exposed plates, in combination with mechanism whereby each plate may successively be transferred from said first-named storage-compartment into said exposure-compartment, mechanism for automatically retaining it therein, and mechanism for automatically ejecting it therefrom into said last-named storage-compartment, substantially as and for the purpose hereinafter specified.

It consists, further, in a camera in which are combined a compartment for the storage of prepared plates, a compartment for exposing prepared plates, a compartment for the storage of plates which have been exposed, mechanism to move a plate from the preliminary storage-compartment into the exposure-compartment, mechanism to automatically uncover the lens whenever a plate is brought into the field of exposure, and mechanism which automatically ejects such plate from said exposing-compartment after an exposure has been made, substantially as and for the purpose hereinafter shown.

It consists, further, in a camera in which are combined a compartment for the storage of prepared plates, a compartment for exposing prepared plates, a compartment for the storage of plates that have been exposed, mechanism for moving a plate from the preliminary storage-compartment into the exposure-compartment, mechanism that automatically uncovers the lens whenever a plate is brought into the field of exposure and automatically covers the lens when such plate is moved into the final storage-compartment, and mechanism which automatically ejects said plate from said exposing-compartment into the final storage-compartment after an exposure has been made, substantially as and for the purpose hereinafter set forth.

It consists, finally, in the construction and combination of parts, substantially as and for the purpose hereinafter set forth.

In carrying our invention into practice we employ a camera-casing A, that is about twice the height and length ordinarily required for a plate of a given size and divide the interior into four compartments, of which the upper front compartment A' forms the camera proper, and within its front end is provided with the usual lens. The lower front compartment $A^2$ is for the reception and storage of prepared plates B and B, and the lower rear compartment $A^3$ is for the storage of plates which have been exposed.

The compartment $A^2$ is provided within its open front end with a removable door $a$, through which plates B and B may be inserted, and upon the inner face of such door is secured one end of a spiral spring C, that from thence extends inward and has its opposite end attached to a plate C', which latter has such size and shape as to enable it to move freely lengthwise of said compartment and by the action of said spring move said plates with a constant following pressure toward the rear end of such compartment.

Figure 8:
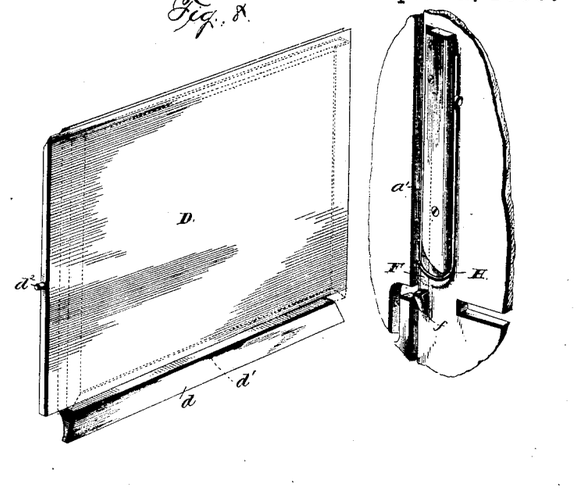
Fig. 8 is a perspective view of the carrier-block and the contiguous portion of one of the sides of the casing.
Figure 9:
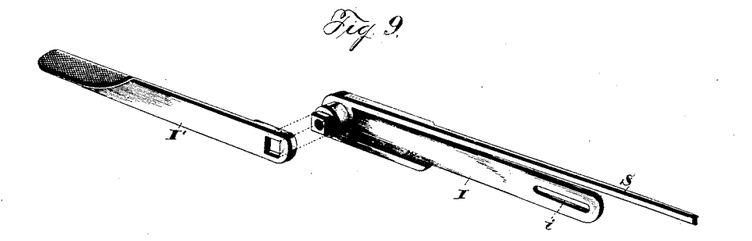
Figure 10:
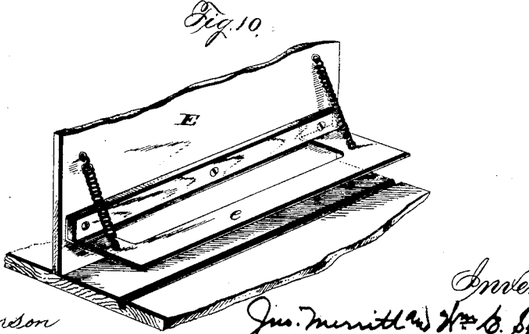
Fig. 10 is a perspective view of a device for holding back within the magazine the plates not engaged by the carrier-block.
Letters of like name and kind refer to like parts in each of the figures.

Working within vertical guides $a'$ and $a'$, that are arranged at the rear ends of the compartments A' and $A^2$, is a carrier D, which has the form shown in Fig. 8 and is adapted to be moved upward or downward, so as to inclose the rear end of either of said compartments. Upon the lower edge at the front side of said carrier is a strip $d$, which extends horizontally across the same and forms a right-angled ledge $d'$, that is flush with the bottom of the compartment A when said carrier is at the lower limit of its motion, at which instant the contiguous plate B, suitably inclosed in the usual holder, is automatically moved rearward against the face of said carrier and upon said ledge. If now the said carrier is moved upward, it will carry with it the plate B, engaged by the ledge $d'$ at its lower end, and will present such plate at the rear end of the compartment in position for exposure.

Figure 1:
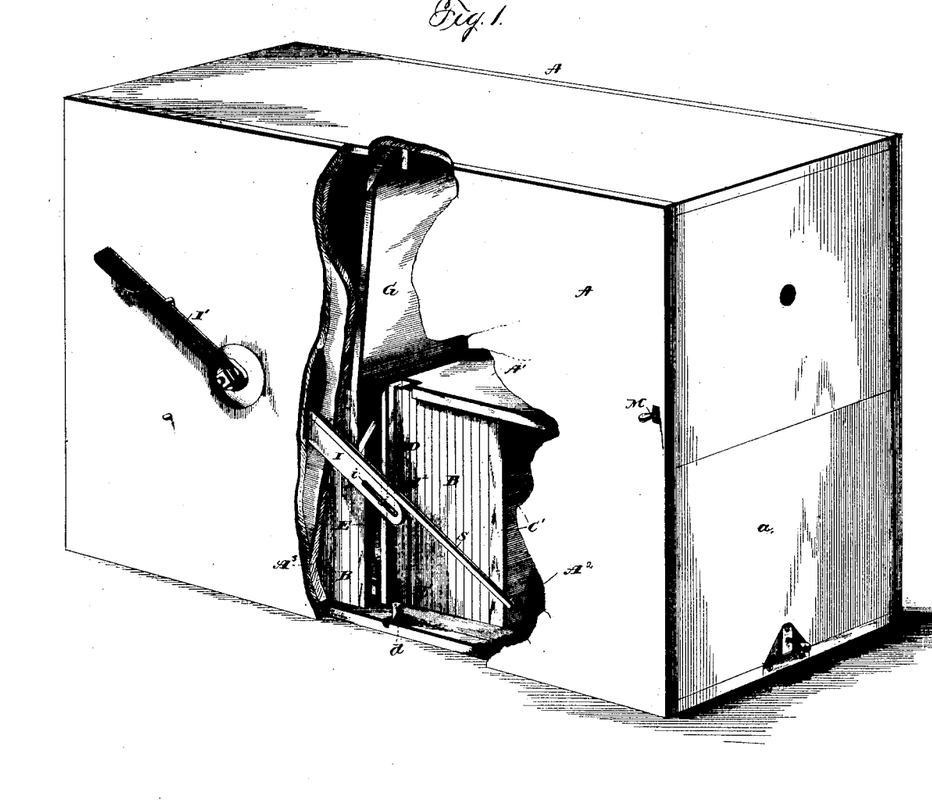
Figure 1 is a perspective view of our camera from the front, portions of the side wall and top of the casing being removed to show the interior construction of parts.
Figure 2:
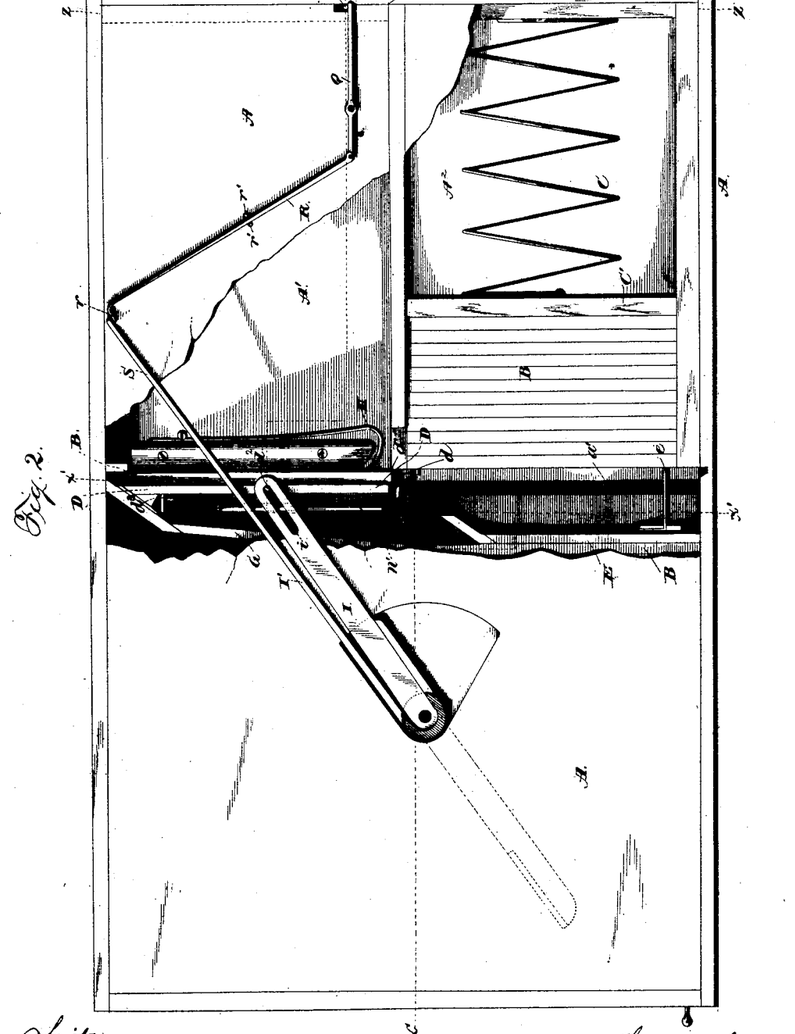
Fig. 2 is a side elevation of the same with a portion of the side wall broken away.
Figure 3:
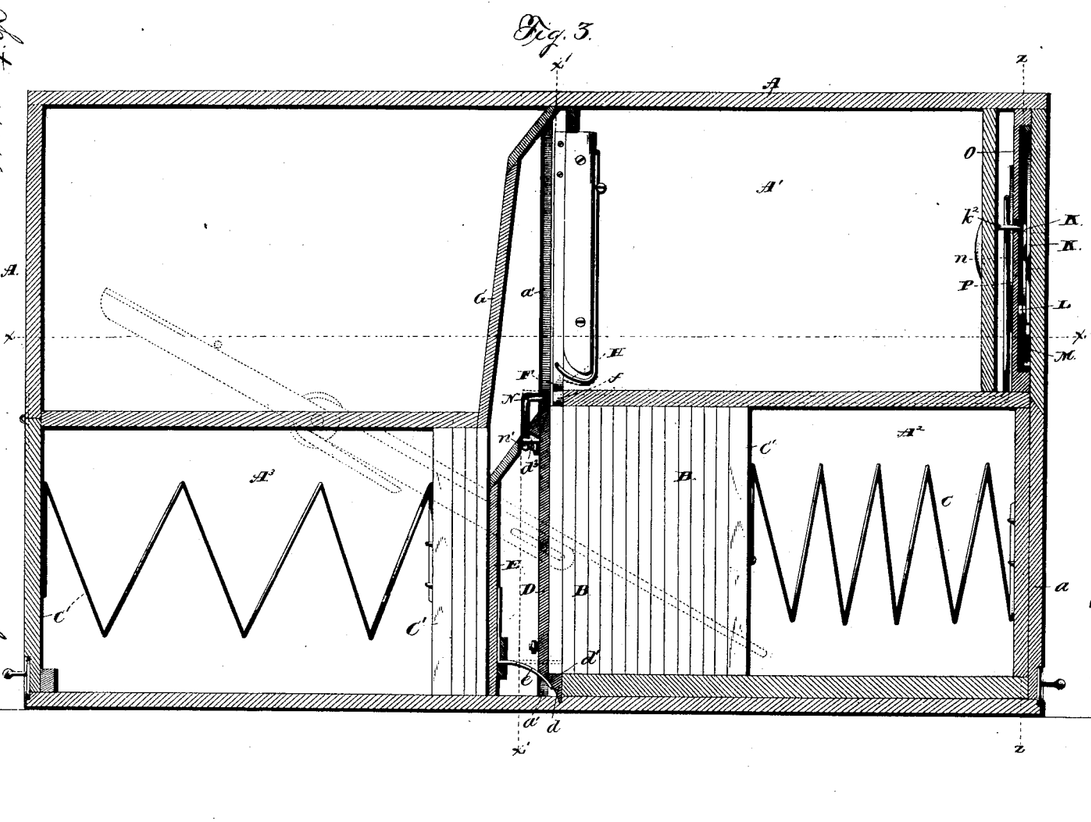
Figs. 3 and 4 are vertical central sections of the camera upon a line extending from front to rear, and show, respectively, the carrier at the lower and upper limits of its motion.

In order that plates B and B within the compartment $A^2$ may be prevented from moving rearward as the carrier D moves upward, the rear side of the strip $d$ has a downward and forward curve, and upon a suitable support E in rear of said carrier are secured two or more spring-arms $e$ and $e$, that, when permitted, extend horizontally forward and have their front ends slightly above the bottom of said compartment and in a line with the front face of said carrier, as shown by dotted lines in Fig. 3, but which when the latter descends are engaged by the curved rear face of said strip $d$ and pressed downward and rearward, as seen by the full lines in said figure. As thus arranged, when the carrier D moves upward the spring-arms $e$ and $e$ resume their normal positions and engage with the lower portion of the rear face of the frame of the plate B next in front of that being raised, when said spring-arms furnish a sufficient bearing or abutment to prevent the lower portions of said plate and those in front of the same from being pressed rearward. The upper portions of said plates are held in place by said strip $d$, which, when said carrier is at the upper limit of its motion, projects downward sufficiently to enable it to engage with said plates.

It is necessary that each plate B should be released from the carrier D when it reaches the highest position, for which purpose a spring F is secured upon each side wall of the casing in such position as to cause it to bear against the side edge of the plate-holder and to lock the latter in position while said carrier is moved downward. Such result may be secured by the direct pressure of said springs upon said plate-holder, or, as preferred, each spring may be provided with a lip $f$, that engages with the lower corner of said holder as the latter reaches the upward limit of its motion; but in either event the result will be to leave the plate suspended when the carrier moves downward again. After the carrier D has moved downward into engagement with a fresh plate B, it is necessary that the plate just operated upon should be transferred to the rear storage-compartment $A^3$, for which purpose there is placed in rear of the carrier-track a transverse partition G, which extends from the top of the casing A downward and rearward to the front end of the horizontal partition that forms the upper side of said compartment. The support E extends vertically upward to within a short distance of the upper side of said compartment, and from thence has a sharp upward and forward inclination until it meets the similarly-inclined upper rear portion of the carrier D.

Figure 4:
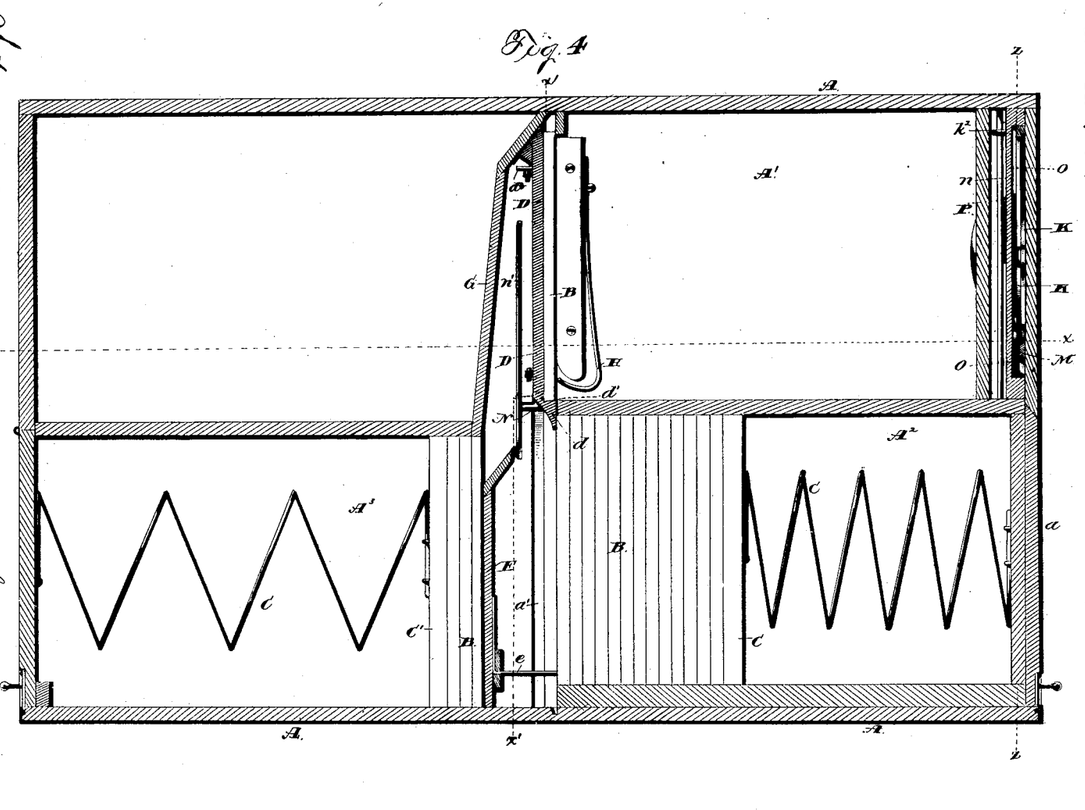
Figure 5:
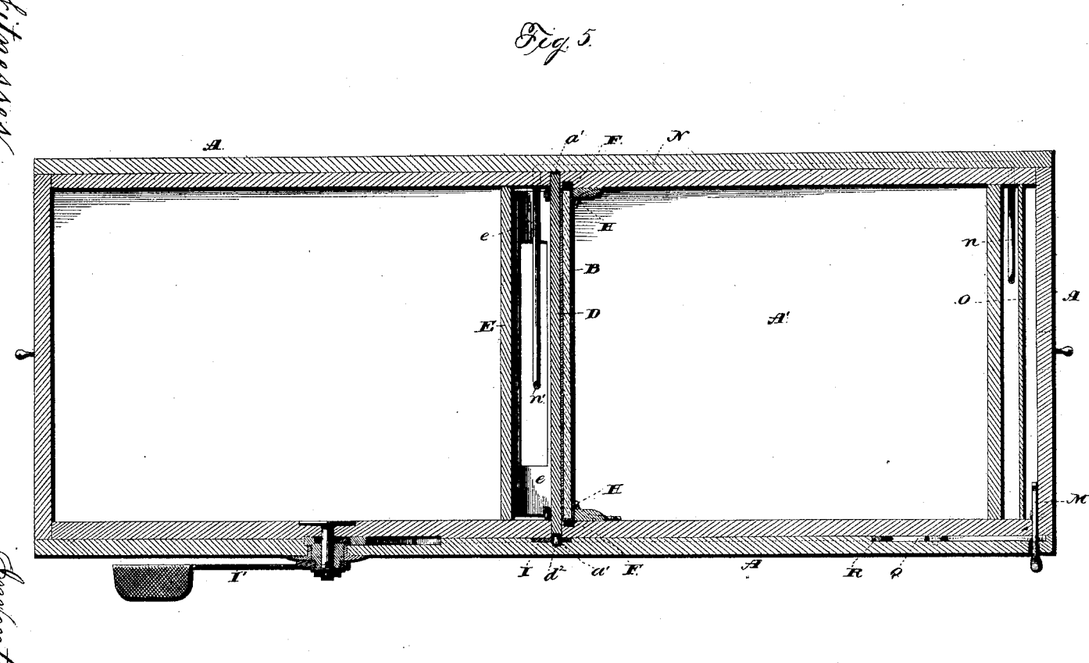
Fig. 5 is a horizontal section of the same upon line *x x* of Fig. 3.

The construction described forms a chute having a downward and a rearward inclination that extends from the rear end of the exposure-compartment A' to the front end of the storage-compartment $A^3$, down which a plate B will safely pass when liberated from the confining-springs F and F. Such liberation is effected by means of two curved springs H and H, which are secured to the side walls of the casing A and bear against the lower portion of the front side of the plate-holder when the latter is at the upper limit of its motion, as shown in Fig. 4. When now the carrier D moves downward, as its upper end passes below the suspended plate said springs H and H press the lower portion of the latter rearward out of engagement with said springs F and F, when said plate is free and drops downward into the said storage-compartment $A^3$. If for any cause a plate does not so drop, said carrier will upon its next upward movement press it rearward entirely out of contact with the suspension-springs, and thus insure its freedom to pass into the storage-compartment.

The plates B and B within the compartment $A^3$ are held in place by means of a spring-pressed follower C and C', which is similar in construction to that before described and is moved rearward as each plate drops into said chamber.

The carrier D is operated by means of a lever I, which is pivoted within one of the sides of the casing A, and near its outer end is provided with a longitudinal slot $i$, that engages with a stud $d^2$, which projects laterally from the contiguous side edge of said carrier. To the pivotal bearing of said lever outside of said casing is secured a second lever I', that extends from thence rearward in convenient form to be engaged by the hand of the operator, the arrangement being such that by a downward pressure upon said lever I' said carrier will be raised, while by reversing the movement of said lever said carrier will be moved to the lower limit of its motion.

Figure 7:
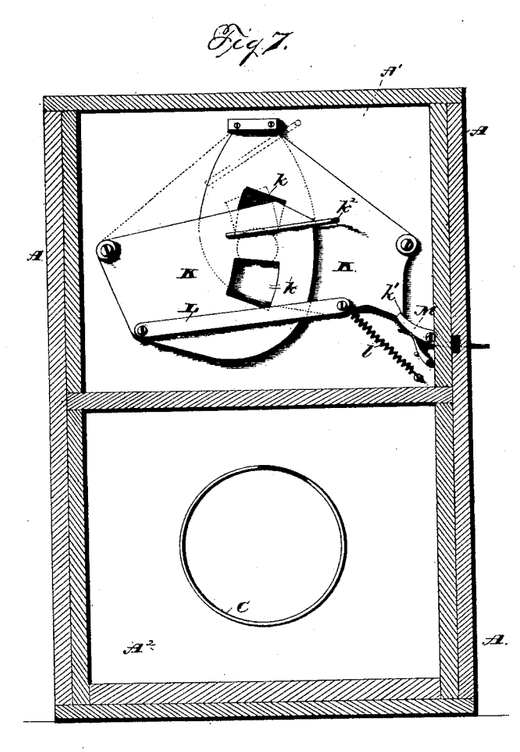
Fig. 7 is a like view of the same upon lines *z z* of said figures, and shows the arrangement of the shutters.

The light-opening of the camera is closed by means of two shutters K and K, which have the shape in elevation seen in Fig. 7 and are pivoted upon opposite sides of said opening to the front wall of the camera-casing. Said shutters have a certain relatively opposite motion and are connected together by means of a rod L, so as to compel their simultaneous movement. Each shutter is provided with an opening $k$, that coincides with the like opening $k$ of the opposite shutter and with the light-opening of the camera when said shutter is at the center of its motion, while when said shutters are at the limits of their motion in either direction their openings do not coincide and said light-opening is covered.

The shutters K and K are normally held at one limit of their motion by means of a spring $l$, which extends between one end of the rod L and a fixed support, while when said shutters are at the opposite limit of their motion they are locked in position by means of a spring-pressed trigger M, that is pivoted within the side of the casing A and engages with a notched projection $k'$ upon one of said shutters. By pressing upon the outer projecting end of said trigger said shutters are released, and by the operation of said spring $l$ are instantly moved to the opposite limit of their motion, during which movement their openings $k$ and $k$ coincide with the light-opening, so as to admit light to the camera.

Figure 6:
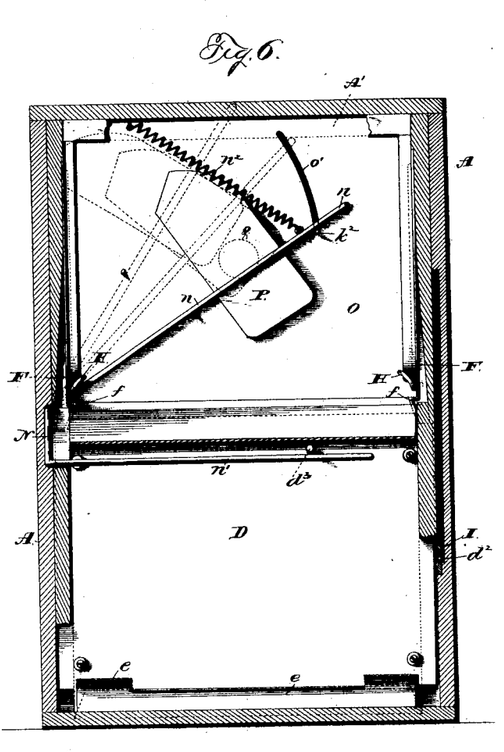
Fig. 6 is a vertical transverse section of said camera upon lines *x′ x′* of Figs. 2, 3, and 4, and shows the arrangement of the hood.

The shutters K and K are automatically set when the carrier D is moved downward by means of a rod N, which is journaled horizontally within one side at the bottom of the compartment A', extends the length of the same, and at its ends is provided with two lateral arms $n$ and $n'$, the first of which extends upward and across the front end of said compartment and engages from above with a stud $k^2$, that projects rearward from one of said shutters, while the arm $n'$ extends from the rear end of said rod across in rear of said carrier and is engaged by a stud $d^3$, which projects rearward from the rear side of the latter over said arm. The relative arrangement of the arms $n$ and $n'$ and their engaging parts is such that when the carrier D is moved to the lower limit of its motion, as shown in Fig. 6, the shutters K and K are moved to and locked in the position seen in Fig. 7, while when said carrier is raised to the upper limit of its motion said rod and its arms are freed, and upon releasing the trigger M said shutters will be discharged, as shown by the dotted lines in Fig. 7, and the other operating parts will be caused to occupy the positions shown by the dotted lines of Fig. 6.

In order that the entrance of light into the camera may be prevented while the shutters are being set, a plate O is placed across the front portion of the compartment A', immediately in rear of said shutters and between the same and the operating arm $n$, and in and through the same is provided an opening $o$, which corresponds to and coincides with the light-opening in the camera-front. A plate or hood P, having the form seen in Fig. 6, is now attached to said arm in such position as to cause it to cover said opening $o$ when the carrier D is moved downward, as shown by the full lines in Fig. 6, and to leave said opening uncovered, as seen in the dotted lines of said figure, when the said shutters are opened. For the rearward passage of the stud $k^2$ a curved slot $o'$ is provided in the plate O, while the shutter-opening spring $l$ is relieved from the weight of the closing mechanism and of the hood by means of a spring $n^2$, that extends between the arm $n$ and some stationary portion of the casing A.

When special rapidity is desired in the successive exposures of plates, the shutter is automatically released and permitted to open as each plate reaches the position for exposure by means of the following-described mechanism, viz: Pivoted horizontally within or upon the side wall of the casing A is a lever Q, which has its front end in contact with the trigger M, while to its rear end is pivoted one end of a rod R, that from thence extends upward and rearward and has at its opposite end a rearward and downward inclined arm $r$. Said rod is held in position and fulcrumed by means of two studs $r'$ and $r'$, which are placed upon opposite sides of the same at or near its longitudinal center. The arm $r$ is engaged by means of a bar S, which is secured to the operating-lever I, or extends outward and upward from the pivotal bearing of the same, and is connected therewith so as to be moved in the same directions with and at the same times as said lever, and to engage with said arm $r$ just before the carrier D reaches the upper limit of its motion, and by a movement of the rod R and lever Q trip the trigger M and release the shutters at the instant said carrier and its plate come to rest. If desired, the bar S may trip over the arm $r$ upon its upward passage and engage with the same to release the shutters when moved downward.

With the mechanism shown and described an operator, without opening the camera or personally handling a plate, may place in position, expose, and store any number of plates within the capacity of the storage-compartments, all of which operations are performed by the simple movements of one lever.

Having thus described our invention, what we claim is—

1. A camera in which a series of prepared plates by mechanical means may be successively moved from a storage-compartment into an exposing-compartment, and then automatically ejected therefrom into a second storage-compartment within the camera-casing, substantially as and for the purpose specified.

2. A camera which is provided with a compartment for the storage of prepared plates, a compartment for the exposure of prepared plates, arranged above the latter, and a compartment for the storage of exposed plates, in combination with mechanism to automatically feed a plate into position to be elevated into the exposure-compartment and mechanism whereby it may be elevated thereto and automatically transferred thence into the last-named storage-compartment, substantially as and for the purpose shown.

3. A camera which is provided with a compartment for the storage of prepared plates, a compartment for the exposure of prepared plates, arranged above said prepared-plate storage-compartment, and a compartment for the storage of plates which have been exposed, in combination with mechanism whereby a plate may be elevated to said exposure-compartment, and mechanism for automatically ejecting it from said exposure-compartment into said last-named storage-compartment, substantially as and for the purpose shown and described.

4. A camera which is provided with a compartment for the storage of prepared plates, a compartment for the exposure of prepared plates, and a compartment for the storage of plates which have been exposed, in combination with mechanism whereby each plate may successively be transferred from the preliminary storage-compartment into said exposure-compartment, mechanism for automatically retaining it therein, and mechanism for automatically ejecting it therefrom into said last-named storage-compartment, substantially as and for the purpose specified.

5. A camera in which are combined a compartment for the storage of prepared plates, a compartment for the exposure of prepared plates, a compartment for the storage of plates which have been exposed, mechanism to move a plate from the preliminary storage-compartment into the exposure-compartment, mechanism to automatically uncover the lens whenever a plate is brought into the field of exposure, and mechanism to automatically eject such plate from said exposure-compartment into the final storage-compartment after an exposure has been made, substantially as and for the purpose shown.

6. A camera in which are combined a compartment for the storage of prepared plates, a compartment for the exposure of prepared plates, a compartment for the storage of plates that have been exposed, mechanism to move a plate from the preliminary storage-compartment into the exposure-compartment, mechanism to automatically uncover the lens whenever a plate is brought into the field of exposure and to automatically cover the lens when such plate is moved into the final storage-compartment, and mechanism to automatically eject said plate from said exposure-compartment into the final storage-compartment after an exposure has been made, substantially as set forth.

7. In a photographic camera, the combination of compartments for the preliminary storage of prepared plates and their exposure, respectively, mechanism for the removal of a plate from one compartment to the other, spring-actuated shutters to uncover and cover the camera light-admitting opening, and a hood arranged to automatically cover said light-admitting opening while said shutters are being set, substantially as and for the purpose shown and described.

8. In a photographic camera, the combination of compartments for the preliminary storage of prepared plates and their exposure, respectively, mechanism for the removal of a plate from one compartment to the other, spring-actuated shutters to uncover and cover the camera light-admitting opening, mechanism, substantially as described, to automatically set said shutters, and a hood which is automatically moved over said light-admitting opening immediately before said shutters are set, substantially as and for the purpose specified.

9. In combination with the plate-holders, mechanism whereby they are moved to and held with a yielding pressure at the rear end of the lower front storage-compartment, the carrier that is adapted to reciprocate vertically at the rear end of said compartment and is provided at its lower end with a ledge for engagement with the lower edge of the contiguous plate-holder, and the pivoted lever engaging with said carrier, substantially as and for the purpose shown.

10. The combination of the reciprocable carrier provided at its lower end with an engaging-ledge, the spring-pressed follower, and the automatically-movable abutments with each other and with a series of plate-holders, substantially as and for the purpose set forth.

11. In combination with the vertically-reciprocating carrier, the spring-detents, which are adapted to engage with and confine in an elevated position a plate-holder, and the releasing-springs, that are adapted to expel said plate-holder from said detents when said carrier has been moved to the lower limit of its motion, substantially as and for the purpose shown and described.

12. As an improvement in photographic cameras, the combination, with the casing having plate-storage and plate-exposure compartments, of the vertically-movable carrier engaging guides in such casing, the stud projecting from the side of the carrier, and the lever pivoted to the casing and engaging said stud, substantially as and for the purpose shown and described.

In testimony that we claim the foregoing we have hereunto set our hands this 20th day of February, 1889.

JOHN MERRITT.
WM. E. SPENCER.

Witnesses:
 JNO. H. KANE,
 E. H. QUANTIN.